US011423430B2

(12) United States Patent
Griffin

(10) Patent No.: US 11,423,430 B2
(45) Date of Patent: Aug. 23, 2022

(54) DYNAMIC EMOJI MODAL ACTIONS

(71) Applicant: PAYPAL, INC., San Jose, CA (US)

(72) Inventor: Kent Griffin, Belmont, CA (US)

(73) Assignee: PayPal, Inc., San Jose, CA (US)

( * ) Notice: Subject to any disclaimer, the term of this patent is extended or adjusted under 35 U.S.C. 154(b) by 0 days.

(21) Appl. No.: 17/334,910

(22) Filed: May 31, 2021

(65) Prior Publication Data

US 2021/0287241 A1    Sep. 16, 2021

Related U.S. Application Data

(63) Continuation of application No. 16/596,042, filed on Oct. 8, 2019, now Pat. No. 11,023,913, which is a continuation of application No. 15/350,650, filed on Nov. 14, 2016, now Pat. No. 10,438,223.

(51) Int. Cl.

| | |
|---|---|
| *G06Q 30/02* | (2012.01) |
| *H04L 51/08* | (2022.01) |
| *H04L 51/18* | (2022.01) |
| *H04W 4/12* | (2009.01) |
| *G06Q 50/00* | (2012.01) |
| *H04L 51/04* | (2022.01) |
| *H04L 51/10* | (2022.01) |
| *H04W 4/21* | (2018.01) |
| *H04W 4/02* | (2018.01) |
| *H04L 67/52* | (2022.01) |

(52) U.S. Cl.
CPC ......... *G06Q 30/0222* (2013.01); *G06Q 50/01* (2013.01); *H04L 51/04* (2013.01); *H04L 51/08* (2013.01); *H04L 51/10* (2013.01); *H04L 51/18* (2013.01); *H04W 4/12* (2013.01); *H04L 67/18* (2013.01); *H04W 4/02* (2013.01); *H04W 4/21* (2018.02)

(58) Field of Classification Search
CPC .... G06Q 30/0222; G06Q 50/01; H04L 51/04; H04L 51/08; H04L 51/10; H04L 51/18; H04L 67/18; H04W 4/12; H04W 4/02; H04W 4/21
See application file for complete search history.

(56) References Cited

U.S. PATENT DOCUMENTS

| | | | |
|---|---|---|---|
| 6,990,452 B1 * | 1/2006 | Ostermann | .......... G06Q 10/107 704/260 |
| 8,190,486 B1 | 5/2012 | Ouimet | |
| 8,521,533 B1 | 8/2013 | Ostermann et al. | |
| 8,918,339 B2 * | 12/2014 | Rubinstein | .............. H04L 51/32 705/39 |
| 9,639,861 B2 * | 5/2017 | DeMattei | .......... H04M 3/42382 |
| 2009/0124268 A1 | 5/2009 | McNamara et al. | |

(Continued)

OTHER PUBLICATIONS

"Dynamic Text Formatting from Derived Sentiment/Emotion from Emojis," An IP.com Prior Art Database Technical Disclosure, Authors et al.: Disclosed Anonymously, Sep. 9, 2016, 3 pages.

(Continued)

*Primary Examiner* — Alexandru Cirnu

(74) *Attorney, Agent, or Firm* — Haynes and Boone, LLP

(57) ABSTRACT

A system and method for receiving and executing emoji based commands in messaging applications. The system and method may include processes such as identifying emojis in a message, determining one or more action based on the emoji, and completing the determined actions.

20 Claims, 5 Drawing Sheets

(56) References Cited

U.S. PATENT DOCUMENTS

| | | | |
|---|---|---|---|
| 2012/0150615 A1* | 6/2012 | Isaacson | G06Q 20/342 705/14.34 |
| 2013/0103766 A1 | 4/2013 | Gupta | |
| 2013/0268335 A1 | 10/2013 | Cooper et al. | |
| 2013/0311368 A1 | 11/2013 | Stacy et al. | |
| 2014/0279418 A1 | 9/2014 | Rubinstein et al. | |
| 2016/0092410 A1 | 3/2016 | Martin | |
| 2016/0173428 A1 | 6/2016 | Balasubramanian et al. | |
| 2017/0358010 A1 | 12/2017 | Montaque et al. | |
| 2018/0373683 A1 | 12/2018 | Hullette et al. | |

OTHER PUBLICATIONS

European Appl. No. 17869691.0, Extended European Search Report dated May 29, 2020, 7 pages.

International Appl. No. PCT/US2017/061127, International Search Report and Written Opinion dated Jan. 19, 2018, 11 pages.

Spasojevic N., et al., "Identifying Actionable Messages on Social Media," Lithium Technologies, Klout 2015, IEEE International Conference on Big Data.

Trzebunia D., "New Coupon Manager App", 2014, http://blog.bronto.com/product/new-coupon-manager-app/, (Year: 2014), pp. 2-10.

* cited by examiner

DYNAMIC EMOJI MODAL ACTIONS

RELATED APPLICATION

This application is a continuation of U.S. application Ser. No. 16/596,042, filed Oct. 8, 2019, which is a continuation of U.S. application Ser. No. 15/350,650, filed Nov. 14, 2016, issued as U.S. Pat. No. 10,438,223 on Oct. 8, 2019, which is incorporated herein by reference in its entirety.

TECHNICAL FIELD

The present disclosure generally relates to text based controls and more specifically enabling Emoji based commands.

BACKGROUND

Recently, Emojis have become popular in text based communications. Emojis are useful for short form communications, especially when it comes to expressing emotions, expressing a thought, or providing context to a message. Often, people use emojis to fill in the loss of communicated information in normal face-to-face conversations that would normally occur through tone of voice, body language, inflections, and/or the like. The difference between an offensive remark and playful remark can depend on how the statement is presented. Similarly, a recipient of a textual message may be insulted if read in one way and amused if read in another way. However, the sender of the message has little control on how a recipient of a message is going to read the message.

Emojis are a good way for a sender to indicate how the author of the message intends to communicate the message. For example, adding a smiley face emoji or a laughing emoji to the end of a harsh statement may indicate that the statement is made in jest.

Emojis are also useful as a short hand to convey a thought or feeling in a message. Emojis may aid in conveying a message in a more whimsical and light hearted manner. In many cases, emojis can be used to discuss a heavy and/or tense subject in a less serious manner. For example, an angry face or sad face emoji may be a less socially awkward way of expressing an emotion to a recipient instead of bluntly stating with words that the recipient has made them angry or sad.

As such, Applicant recognizes that it would be beneficial if Emojis could be expanded to cover or aid additional expressions through increased functionalities.

Figure 1:
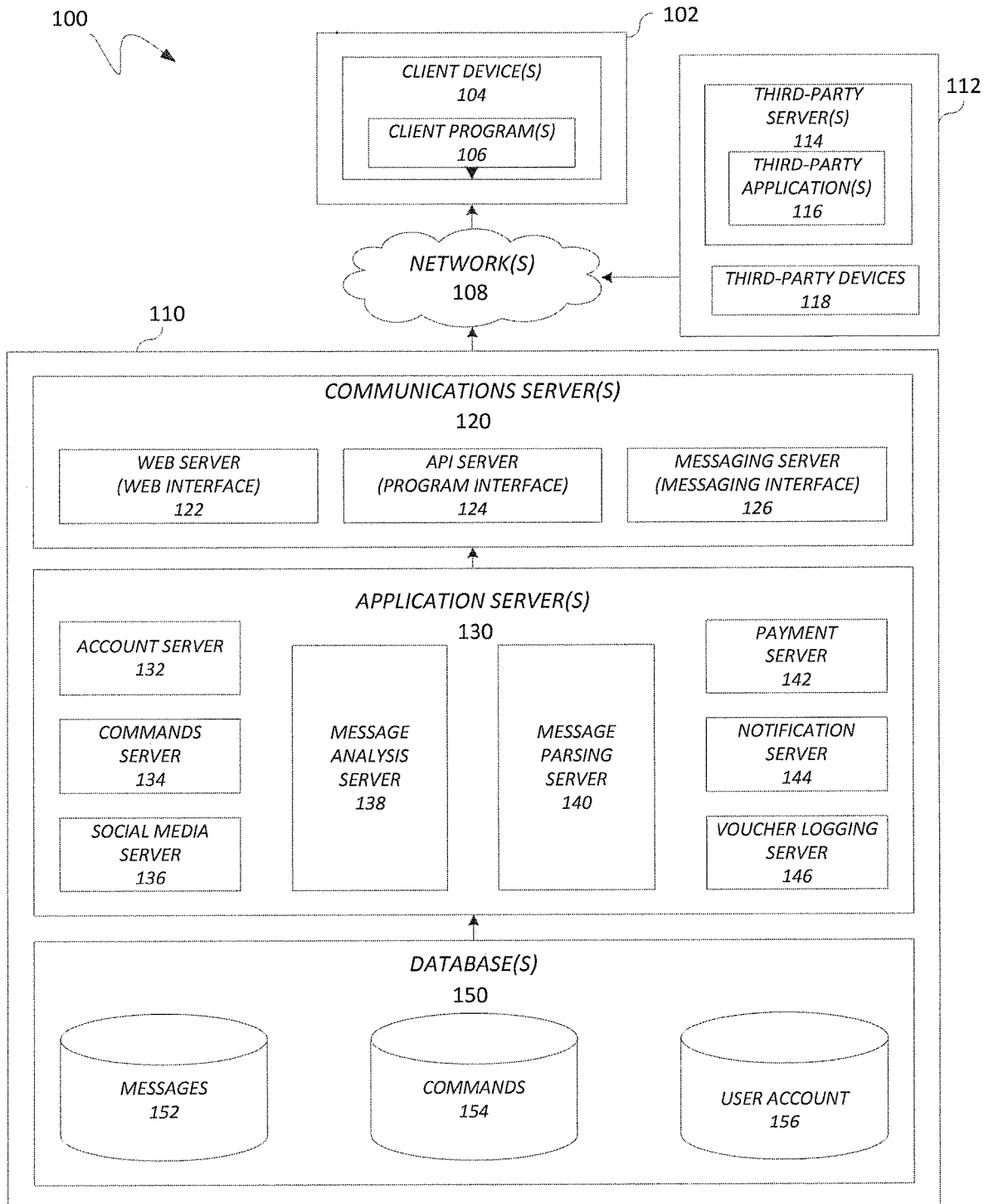
FIG. 1 is a block diagram of an example computing system that is adapted for implementing dynamic emoji modal actions.

Embodiments of the present disclosure and their advantages are best understood by referring to the detailed description that follows. It should be appreciated that like reference numerals are used to identify like elements illustrated in one or more of the figures, wherein showings therein are for purposes of illustrating embodiments of the present disclosure and not for purposes of limiting the same.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

FIG. 1 illustrates, in block diagram format, an example embodiment of a computing system adapted for implementing dynamic emoji modal actions. As shown, a computing system 100 may comprise or implement a plurality of servers and/or software components that operate to perform various methodologies in accordance with the described embodiments. Example servers may include, for example, stand-alone and enterprise-class servers operating a server operating system (OS) such as a MICROSOFT® OS, a UNIX® OS, a LINUX® OS, or other suitable server-based OS. It may be appreciated that the servers illustrated in FIG. 1 may be deployed in other ways and that the operations performed and/or the services provided by such servers may be combined, distributed, and/or separated for a given implementation and may be performed by a greater number or fewer number of servers. One or more servers may be operated and/or maintained by the same or different entities.

Computing system 100 may include, among various devices, servers, databases and other elements, one or more clients 102 that may comprise or employ one or more client devices 104, such as a laptop, a mobile computing device, a tablet, a PC, a wearable device, and/or any other computing device having computing and/or communications capabilities in accordance with the described embodiments. Client devices 104 may include a cellular telephone, smart phone, or other similar mobile devices that a user may carry on or about his or her person and access readily.

Client devices 104 generally may provide one or more client programs 106, such as system programs and application programs to perform various computing and/or communications operations. Example system programs may include, without limitation, an operating system (e.g., MICROSOFT® OS, UNIX® OS, LINUX® OS, Symbian OS™, Embedix OS, Binary Run-time Environment for Wireless (BREW) OS, JavaOS, a Wireless Application Protocol (WAP) OS, and others), device drivers, programming tools, utility programs, software libraries, application programming interfaces (APIs), and so forth. Example application programs may include, without limitation, a web browser application, messaging applications (e.g., e-mail, IM, SMS, MIMS, telephone, voicemail, VoIP, video messaging, internet relay chat (IRC)), contacts application, calendar application, electronic document application, database application, media application (e.g., music, video, television), location-based services (LBS) applications (e.g., GPS, mapping, directions, positioning systems, geolocation, point-of-interest, locator) that may utilize hardware components such as an antenna, and so forth. One or more of client programs 106 may display various graphical user interfaces (GUIs) to present information to and/or receive information from one or more users of client devices 104. In some embodiments, client programs 106 may include one or more applications configured to conduct some or all of the functionalities and/or processes discussed below.

As shown, client devices 104 may be communicatively coupled via one or more networks 108 to a network-based system 110. Network-based system 110 may be structured, arranged, and/or configured to allow client 102 to establish one or more communications sessions between network-based system 110 and various computing devices 104 and/or client programs 106. Accordingly, a communications session between client devices 104 and network-based system 110 may involve the unidirectional and/or bidirectional exchange of information and may occur over one or more types of networks 108 depending on the mode of communication. While the embodiment of FIG. 1 illustrates a computing system 100 deployed in a client-server operating environment, it is to be understood that other suitable operating environments and/or architectures may be used in accordance with the described embodiments.

Data communications between client devices 104 and the network-based system 110 may be sent and received over one or more networks 108 such as the Internet, a WAN, a WWAN, a WLAN, a mobile telephone network, a landline telephone network, as well as other suitable networks. For example, client devices 104 may communicate with network-based system 110 over the Internet or other suitable WAN by sending and or receiving information via interaction with a web site, e-mail, IM session, and/or video messaging session. Any of a wide variety of suitable communication types between client devices 104 and system 110 may take place, as will be readily appreciated. In particular, wireless communications of any suitable form may take place between client device 104 and system 110, such as that which often occurs in the case of mobile phones or other personal and/or mobile devices.

In various embodiments, computing system 100 may include, among other elements, a third party 112, which may comprise or employ third-party servers 114 hosting a third-party applications 116 and third-party devices 118. In various implementations, third-party servers 114 and/or third-party applications 116 may host applications associated with or employed by a third party 112. For example, third-party servers 114 and/or third-party applications 116 may enable network-based system 110 to provide client 102 with additional services and/or information, such as message logging, message transferring, command recognition, security functions, and/or other services, some of which will be discussed in greater detail below. Third-party servers 114 and/or third-party applications 116 may also provide system 110 and/or client 102 with other information and/or services, such as email services and/or information, social networking services and/or information, property transfer and/or handling, purchase services and/or information, and/or other online services and/or information.

In one embodiment, third-party servers 114 may include a social networking server that hosts a user's social network account. In another embodiment, third party-servers 114 may include an email server that hosts a user's email account. In some embodiments, third-party servers 114 may include an instant messaging server that receives and transmits electronic messages from a user account. In yet another embodiment, third-party severs 114 may include one or more servers for aggregating user data and statistics.

Network-based system 110 may comprise one or more communications servers 120 to provide suitable interfaces that enable communication using various modes of communication and/or via one or more networks 108. Communications servers 120 may include a web server 122, an API server 124, and/or a messaging server 126 to provide interfaces to one or more application servers 130. Application servers 130 of network-based system 110 may be structured, arranged, and/or configured to provide various online services, account authentication, social networking, account management, merchandise recommendations, product discount notifications, product locating, product purchasing and other services to users that access network-based system 110. In various embodiments, client 102 may communicate with applications servers 130 of network-based system 110 using one or more client devices 104 via one or more of a web interface provided by web server 122, a programmatic interface provided by API server 124, and/or a messaging interface provided by messaging server 126. It may be appreciated that web server 122, API server 124, and messaging server 126 may be structured, arranged, and/or configured to communicate with various types of client devices 104, third-party servers 114, third-party applications 116, and/or client programs 106 and may interoperate with each other in some implementations.

Web server 122 may be arranged to communicate with web clients and/or applications such as a web browser, web browser toolbar, desktop widget, mobile widget, web-based application, web-based interpreter, virtual machine, and so forth. API server 124 may be arranged to communicate with various client programs 106 and/or a third-party application 116 comprising an implementation of API for network-based system 110. Messaging server 126 may be arranged to communicate with various messaging clients and/or applications such as e-mail, IM, SMS, MIMS, telephone, VoIP, video messaging, IRC, and so forth, and messaging server 126 may provide a messaging interface to enable access by client 102 and/or third party 112 to the various services and functions provided by application servers 130.

Application servers 130 of network-based system 110 may be a server that provides various product purchasing, product discounting, property transfer, notification, and social connection services. Application server 130 of network-based system 110 may provide services such as, account services, authentication services, content management services, payment services, user data gathering services, return services, product purchasing services, delivery services, location services, notification services, fund transfer, funds and/or currency exchanges, gifting services, and/or other services. Application servers 130 may include an account server 132, a message analysis server 138, a message parsing server 140, a payment server 142, a notification server 144, and/or a voucher logging server 146. Application servers 130 may further include commands server 134 and a social media server 136. These servers, which may be in addition to other servers, may be structured and arranged to aid in dynamically enabling emoji based actions that are sent through a messaging application as discussed above and in more detail below.

Application servers 130, in turn, may be coupled to and capable of accessing one or more databases 150 including a messages database 152, a commands database 154, and/or user account database 156. Databases 150 generally may store and maintain various types of information for use by application servers 130 and may comprise or be implemented by various types of computer storage devices (e.g., servers, memory) and/or database structures (e.g., relational, object-oriented, hierarchical, dimensional, network) in accordance with the described embodiments.

Figure 2:
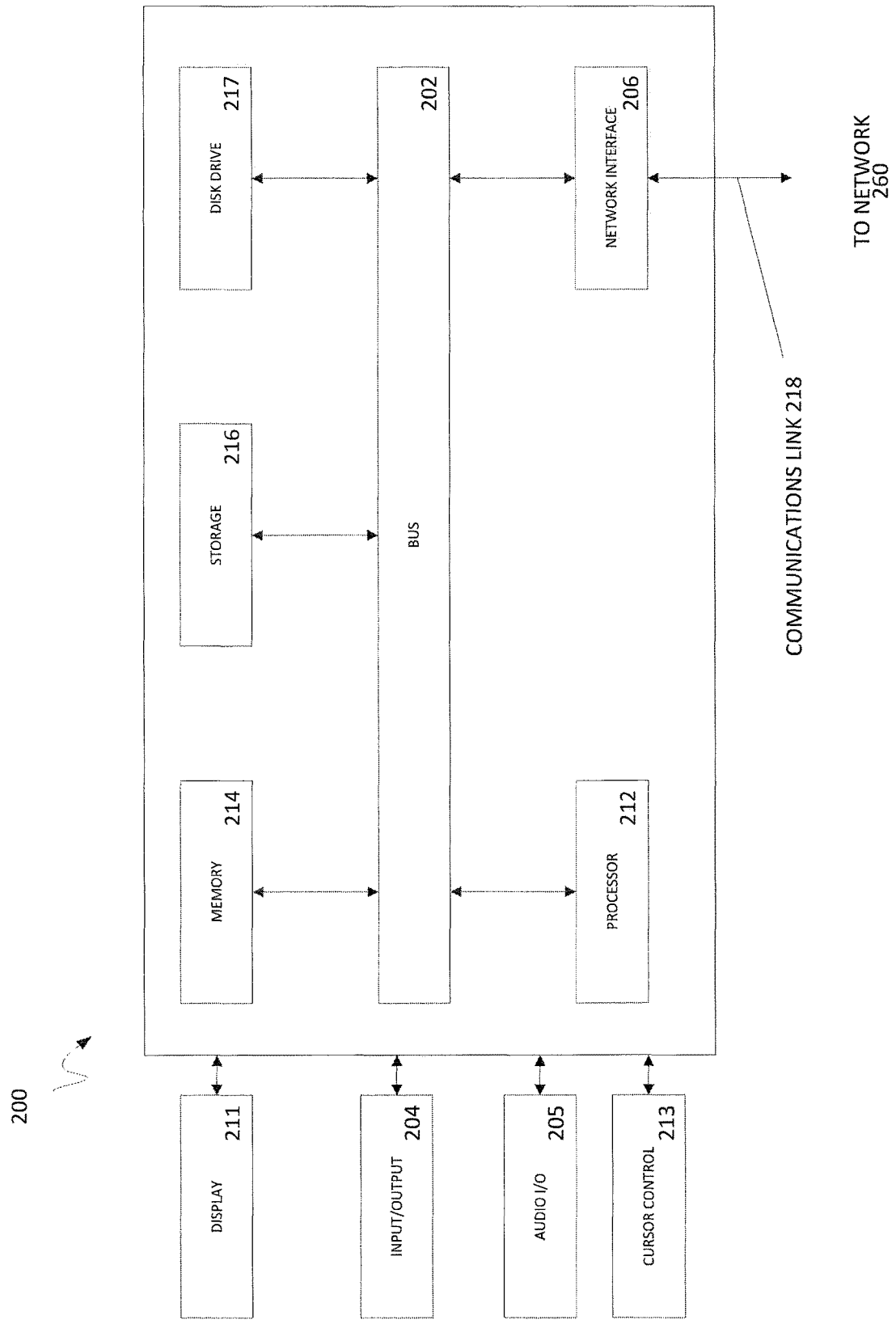
FIG. 2 is a block diagram of an example computer system suitable for implementing one or more devices of the computing system in FIG. 1.

FIG. 2 illustrates an example computer system 200 in block diagram format suitable for implementing on one or more devices of the computing system in FIG. 1. In various implementations, a device that includes computer system 200 may comprise a personal computing device (e.g., a smart or mobile phone, a computing tablet, a personal computer, laptop, wearable device, PDA, smart watch, and/or the like) that is capable of communicating with a network. A service provider and/or a payment provider may utilize a network computing device (e.g., a network server) capable of communicating with the network. It should be appreciated that each of the devices utilized by users, service providers, and/or payment providers may be implemented as computer system 200 in a manner as follows.

Additionally, as more and more devices become communication capable with computing capabilities, these devices may also be used as devices part of system 100.

Computer system 200 may include a bus 202 or other communication mechanisms for communicating information data, signals, and information between various components of computer system 200. Components include an input/output (I/O) component 204 that processes a user action, such as selecting keys from a keypad/keyboard, selecting one or more buttons, links, actuatable elements, etc., and sends a corresponding signal to bus 202. I/O component 204 may also include an output component, such as a display 211 and a cursor control 213 (such as a keyboard, keypad, mouse, touch screen, etc.). An optional audio input/output component 205 may also be included to allow a user to use voice for inputting information by converting audio signals. Audio I/O component 205 may allow the user to hear audio. A transceiver or network interface 206 transmits and receives signals between computer system 200 and other devices, such as another user device, a merchant server, an email server, application service provider, web server, a social networking server, a payment provider server, and/or other servers via a network. In various embodiments, such as for many cellular telephone and other mobile device embodiments, this transmission may be wireless, although other transmission mediums and methods may also be suitable. A processor 212, which may be a micro-controller, digital signal processor (DSP), or other processing component, processes these various signals, such as for display on computer system 200 or transmission to other devices over a network 260 via a communication link 218. Again, communication link 218 may be a wireless communication in some embodiments. Processor 212 may also control transmission of information, such as cookies, IP addresses, and/or the like to other devices.

Components of computer system 200 also include a system memory component 214 (e.g., RAM), a static storage component 216 (e.g., ROM), and/or a disk drive 217. Computer system 200 performs specific operations by processor 212 and other components by executing one or more sequences of instructions contained in system memory component 214. Logic may be encoded in a computer readable medium, which may refer to any medium that participates in providing instructions to processor 212 for execution. Such a medium may take many forms, including but not limited to, non-volatile media, volatile media, and/or transmission media. In various implementations, non-volatile media includes optical or magnetic disks, volatile media includes dynamic memory, such as system memory component 214, and transmission media includes coaxial cables, copper wire, and fiber optics, including wires that comprise bus 202.

In one embodiment, the logic is encoded in a non-transitory machine-readable medium. In one example, transmission media may take the form of acoustic or light waves, such as those generated during radio wave, optical, and infrared data communications.

Some common forms of computer readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, or any other medium from which a computer is adapted to read.

In various embodiments of the present disclosure, execution of instruction sequences to practice the present disclosure may be performed by computer system 200. In various other embodiments of the present disclosure, a plurality of computer systems 200 coupled by communication link 218 to the network (e.g., such as a LAN, WLAN, PTSN, and/or various other wired or wireless networks, including telecommunications, mobile, and cellular phone networks) may perform instruction sequences to practice the present disclosure in coordination with one another. Modules described herein may be embodied in one or more computer readable media or be in communication with one or more processors to execute or process the steps described herein.

A computer system may transmit and receive messages, data, information and instructions, including one or more programs (i.e., application code) through a communication link and a communication interface. Received program code may be executed by a processor as received and/or stored in a disk drive component or some other non-volatile storage component for execution.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the spirit of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable media. It is also contemplated that software identified herein may be implemented using one or more computers and/or computer systems, networked and/or otherwise. Such software may be stored and/or used at one or more locations along or throughout the system, at client 102, network-based system 110, or both. Where applicable, the ordering of various steps described herein may be changed, combined into composite steps, and/or separated into sub-steps to provide features described herein.

The foregoing networks, systems, devices, and numerous variations thereof may be used to implement one or more services, such as the services discussed above and in more detail below.

Figure 3:
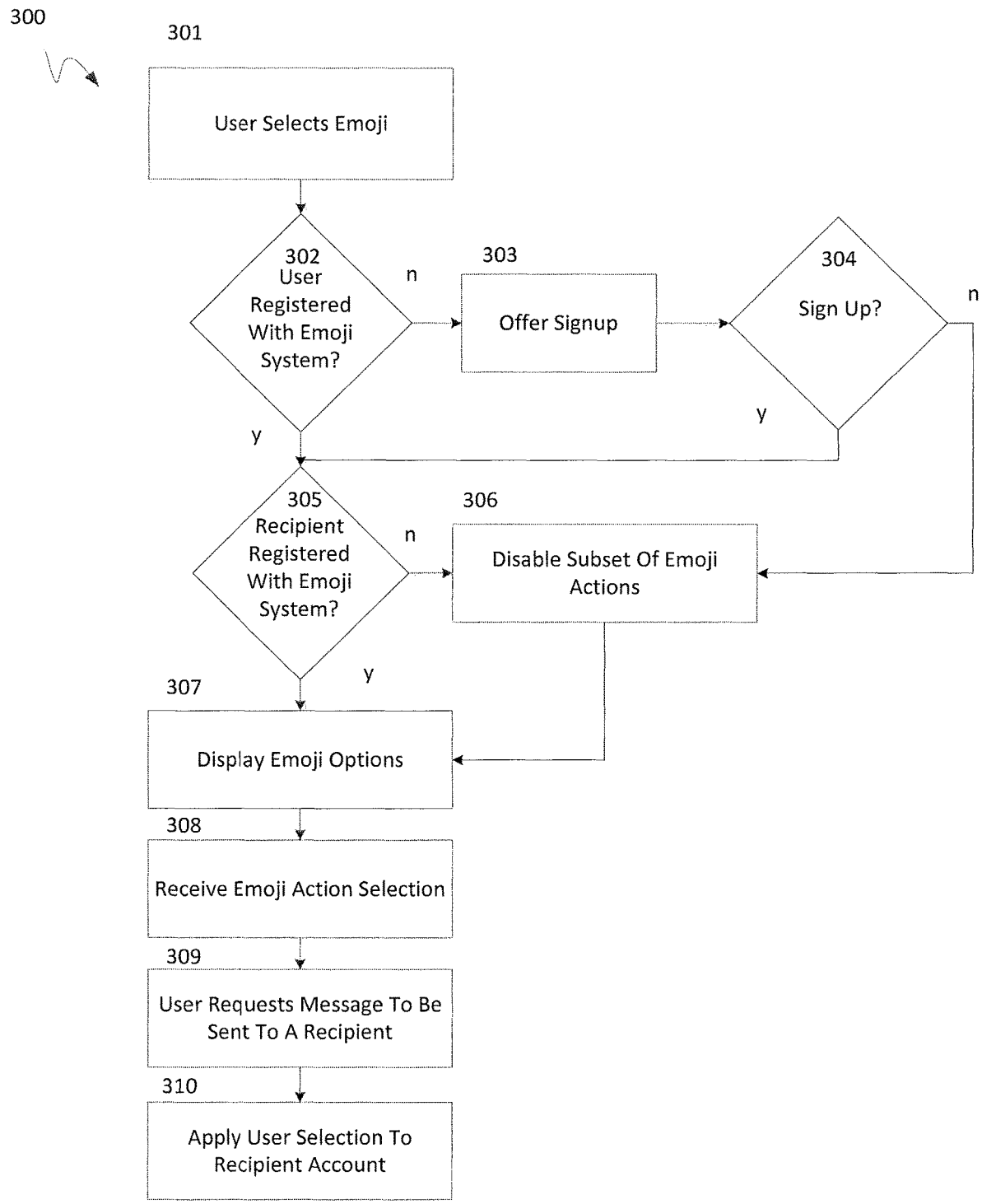
FIG. 3 is a flow diagram illustrating an example dynamic emoji modal action implementation.

FIG. 3 is a flow diagram illustrating processes 300 of an example dynamic emoji modal action implementation. Processes 300 may be implemented on one or more devices of a system such as system 100 of FIG. 1 according to some embodiments. According to some embodiments, processes 300 may include one or more of processes 301-310 which may be implemented, at least in part, in the form of executable code stored on a non-transitory, tangible, machine readable media that, when run on one or more processors, may cause a system to perform one or more of the processes 301-310.

At process 301, the system may receive an indication that a user has selected an emoji for a messaging or social media application. For example, a user using a device, such as client device 104 (which may be a smart phone, personal computer, or other computing device), may have selected an emoji in a texting application installed on a device of the system, such as a short message service (SMS) texting application, an instant message application, social media messaging application. In some examples the emoji may be a combination of ASCII characters, encoded in a character space (such as the Unicode character space) compatible with the associated application, and/or the like.

In some examples, to select the emoji, a user may pick the emoji from a table of emojis shown on a screen or displaying device. In some examples, an electronic actuatable button is shown that a user may actuate in one or more manners, such as by touching a touch screen, guiding a graphical pointer with a mouse and physically clicking the mouse, and/or the like.

In some examples, the emoji itself may be the actuatable button for selection. A user may click using a mouse, touch a screen, long press on a touch screen display, conduct a higher pressured press on a pressure sensitive touch screen, and/or the like on the location that the emoji is displayed to select the emoji. In some examples this may occur after selecting an emoji from a table of emojis to use as part of a text message and/or during the selection of the emoji from the table of emojis.

In some examples, the system may check whether the user or device is registered with the system at operation 302. In some examples, operation 302 may be in response to receiving an indicator that the user selected an emoji at operation 301. The system may enable and/or disable certain features depending on whether the user is registered.

In some examples, the system may check whether the user provided account information associated with a registration. For example, the system may check for usernames, passwords, cookies, tokens, and/or other authentication and/or identifying information. In some examples, the system may check for other identifiers such as device identifiers, hardware identifiers, carrier identifiers, application license identification, and/or the like to determine whether the device and/or user of the device is registered with the system. The system may check a database to determine whether the identifier associated with the user and/or device is registered with the system. In some examples, the existence of a certain application may establish that the user is registered with the system, which may be determined based on application identifying information that is passed to the system (e.g. serial number).

In some examples, process 300 may include operation 303 and operation 305. Operation 303 may occur in response to the system determining that the user is not registered with the system at operation 302. Operation 305 may occur in response to the system determining that the user is registered with the system. At operation 303, the system may provide an offer to the user to sign up with the system. For example, the system may cause the user device to display a pop up or a link for signing up with the system. The system may provide entry fields to provide user information. In some examples, the system may send a message with a link to a signup webpage.

In some examples, the system may continue to operation 304 from operation 303. At operation 304 the system may determine whether the user registered with the system or not. The system may check whether the user provided registration information. In some examples, the system may check whether a response was provided to a confirmation message, such as a confirmation email. If the system determines that the user registered with the system, the system may continue to operation 305, otherwise the system may continue to operation 306.

At operation 305, the system may determine whether an intended recipient of the message is registered with the emoji system. In some examples, the system may determine the intended recipient from the user device. A user may have entered a destination identifier for a message, such as a phone number, user name, email, and/or the like. The system may use the identifier to determine whether the recipient user is registered with the system. The system may cross reference a database of registered user information for a match with the identifier. A match would indicate that the recipient is registered with the system.

If the system determines that the intended recipient is also registered with the system, process 300 may continue to operation 307. Otherwise, the system may continue to operation 306. In some examples, operation 305 may be omitted and continue from operation 302 to 307.

In some examples, process 300 may include operation 306. At operation 306, the system may disable certain emoji actions in response to determining that the user and/or the recipient is not registered with the system. For example, the system may gray out or hide several emoji action options that may normally be provided. Some example options that may be disabled are emoji actions that are associated with monetary transfers. In this manner, a user is diverted away from conducting an emoji action that the system may not be capable of performing due to one or more restrictions.

In some embodiments, process 300 many include operation 307. At operation 307, the system may display one or more actions associated with the emoji selected at operation 301. In some examples, the actions may depend on several factors, such as the type of emoji, a system determined and/or assigned action with the emoji, the location of the user device, location of the recipient device, and/or the like. An example process for dynamically providing emoji actions is discussed in more detail below.

In some examples, process 300 may include operation 308. At operation 308, the system may receive a user selected emoji action from the options provided at operation 307. For example, the option may be to purchase a beer for someone.

At operation 309, the system may receive a request to send the message to the recipient. For example, a user may have actuated a button, such as an electronic actuatable button through a touch screen, indicating to the system to send the message with the emoji.

At operation 310, the selected action from operation 308 may be linked, connected, and/or applied to the recipient account. For example, the system may provide the recipient account with a voucher on a purchase of beer if the user selected the action of purchasing a beer. When the system detects the recipient is buying a beer, the beer may be purchased using the account associated with the user that sent the emoji action. Detecting when a user is purchasing a beer may be conducted in many different ways, some of which are discussed in more detail below. As an example, the system may be in communication with, or may serve as, a payment intermediary that receives receipt information for purchases. The system may check the receipt information for indicators of a beer purchase, such as trademark names associated with beer or purchases from a merchant that sells beer. In some examples, the system may permit the voucher to be used for purchases of items that the system does not categorize as a beer but are similarly categorized (e.g., items that the system categorizes as drinks such as sodas, juices, drinks, food, and/or other categories). In some examples, the system may conduct the purchase with the voucher through reimbursement (e.g. the purchase may be conducted using an account of the purchaser and the value of the purchase may be reimbursed by an account of the sender of the emoji/voucher). In some examples, the system may credit the user a monetary value associated with beer for conducting a purchase at one or more merchants. In some examples, the system may conduct a purchase of beer to be delivered to a location of the user and send notification of the purchase to the user. One of ordinary skill in the art reading this specification would understand that this system may be implemented with different actions depending on the action selected at operation 308, all of which are intended to be incorporated as part of this disclosure.

Figure 4:
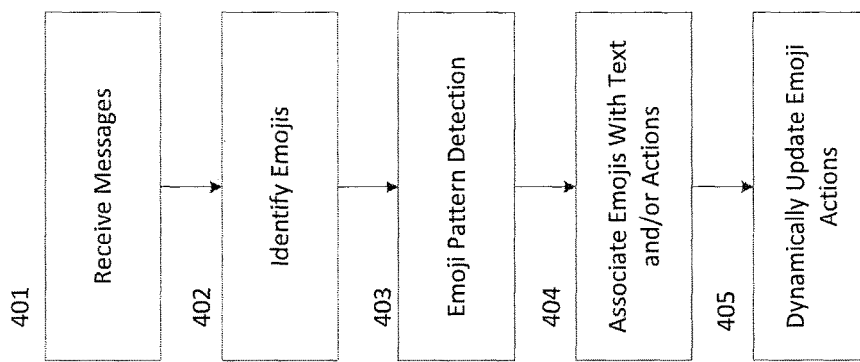
FIG. 4 is a flow diagram illustrating an example process for dynamically assigning actions to emojis.

FIG. 4 is a flow diagram illustrating processes 400 for dynamically assigning actions to emojis. Processes 400 may be implemented on one or more devices of a system such as system 100 of FIG. 1 according to some embodiments. According to some embodiments, processes 400 may include one or more of processes 401-405 which may be implemented, at least in part, in the form of executable code stored on a non-transitory, tangible, machine readable media that, when run on one or more processors, may cause a system to perform one or more of the processes 401-405. Applicant recognizes that actions for emojis may depend on many factors and may evolve over time. As such, Applicant recognizes that it would be beneficial if the system evolved and dynamically created actions to attach with emojis.

In some examples, process 400 may include operation 401. At process 401, the system may receive a plurality of messages with emojis from a plurality of client devices, users, accounts, and/or the like. For example, the system may include one or more servers that serves as an intermediary for directing messages. The system may handle, coordinate, and direct messages from one user device to another and/or multiple devices. Furthermore, the system may receive and/or scrape messages with emojis from one or more social media sources.

At operation 402, the system may parse the messages it receives to identify emojis. Emojis may be identified based on a combination of ASCII codes and/or other code values associated with emoji symbols. For example ":" is associated with ASCII code number 3A in hexadecimal and ")" has an ASCII code number 29 in hexadecimal. The combination of ASCII code 3A and 29 may be associated with the smiley face emoji "☺". Similarly Unicode value U+1F600 is associated with the grinning face emoji. The system may parse messages to find matching information associated with one or more emojis.

At operation 403, the system may identify a pattern associated with one or more emojis in the text of messages the system receives. For example, the system may cluster the text or words that are in messages with emojis to determine a relationship between the words and emojis. The system may collect other contextual information associated with the message to identify patterns with the emoji. For example, time of day, location of the user device and/or recipient device, day of the year, age of the sender or recipient, gender, nationality, date significance (birthday, graduation day, holiday, etc.), and/or the like. The messages and emojis may also be clustered using the contextual information as well to find links between the emojis and contextual information.

In some examples, the system may determine a pattern of actions that are associated with an emoji as well. For example, some messages may accompany a purchase or transfer of money. For example, Venmo® is a popular payment service where users regularly add a message including an emoji along with a transaction. The system may use one or more clustering algorithms (e.g. nearest neighbor, k-means, n-grams, and/or the like) to identify emojis that are associated with an item or transaction. For example, users may regularly use the pizza icon when conducting a transaction associated with a pizza purchase or a beer icon when conducting transactions associated with beer purchases, which the clustering algorithm may be configured to detect. In some examples, the system may create associations once a threshold number of emoji uses have been detected.

The system may also separate the data before clustering for more granularity in emoji use. Different geographical areas and/or demographics may use emojis differently or have different values. For example, red envelopes of one age group or geographical area may be accompanied with a lower average transaction value than with a different age group or geographical location (such as city, town, country, state, and/or the like). As such, the system may use GPS information to associate emojis with text and/or actions. In some examples, the level of granularity the system clusters emojis for may depend on popularity of the emoji use and or threshold number of usages.

At operation 404, the system may associate Emojis with the text and/or actions and dynamically update and/or enable actions based on the patterns determined at operation 403. Some example actions may be providing vouchers, reimbursements, purchase options, monetary transfers, and/or the like.

In some embodiments, the system may provide a user the option to send a user specific voucher associated with an emoji. For example, the system may have determined at operation 403 that the beer emoji is often associated with drinks or with a drink transaction. As such, at operation 404, the system may associate the beer emoji with a voucher function. The voucher function may be to link a voucher to the emoji so that the recipient receives a voucher for a drink purchase that is paid for or linked to a sender payment account. In this manner, a sender, when sending a message with a beer emoji, would be provided the option to attach a voucher with the emoji to be sent to the recipient. The next time the recipient buys a drink using a payment account associated with the system, the drink may be purchased using the voucher. The voucher may cause the system to use a payment instrument associated with the sender account to pay for the drink transaction. In some examples, the voucher function may allow the sender to limit the maximum transaction amount for the drink and/or the number of drinks. In this manner, the sender can be assured that the user cannot take advantage of the sender by purchasing an abnormally expensive drink. In some examples, the system may provide a price recommendation for the voucher based on the location of the recipient and the average cost of a drink near the geographic location of the recipient. In some examples, the system may provide a price recommendation based on the average price of a drink that a recipient has purchased within a predetermined time frame. In some examples, the average price may be based on the geolocation of the recipient. Although the foregoing example uses a beer emoji associated with a drink, there are other emoji symbols and associations that would also function similarly such as the pizza emoji and the purchase of a pizza, a taco emoji and the purchase of a taco, Chinese/lunar new year emojis (e.g. emojis of new year animals, fireworks, red envelopes, moon cake, and/or the like) and sending Chinese/lunar new year monetary gifts, flower emoji and sending flowers, graduation emojis (e.g. emojis of a graduation cap, graduation gown, diploma, and/or the like) and graduation gifts, and/or the like.

In some examples, the system may configure vouchers as a reimbursement. For example, a user may purchase an item using their own account, and when the system determines that the user bought an object associated with a voucher based on a receipt, the purchase price of the item may be reimbursement by the sender of the voucher. Similarly to the voucher discussed above, the amount of the voucher may be preset, automatically determined based on an average, determined based on the cost, have a max and/or min value, and/or the like, which may be set by the system and/or the sender. In some examples, a voucher with a minimum value may be reused for multiple purchases until the voucher value is exhausted.

In some examples, an emoji action may facilitate an item purchase for a recipient. For example, the pizza emoji may be associated with the action of purchasing pizza. As such, one of the action options associated with the pizza emoji may be to purchase a pizza for a recipient of the message. The system may detect the location (e.g. GPS coordinates) of the recipient by communicating with the recipient device and identify nearby pizza merchants. The system may then provide the user the ability to purchase a pizza from the pizza merchants and deliver the pizza to the recipient. In some examples, the system may allow the user to select or create a menu of items from multiple merchants such that the recipient may choose the item to be purchased when the recipient receives the message. Upon selection of an item off the user created menu, the system may facilitate the purchase of the item using an account of the user and having the item delivered to the location of the recipient.

In some examples, the action associated with the image may be a monetary transfer. For example, a user may use a red envelope emoji in a message to send a recipient money. The value of the transfer may be set by the system based on analysis of money transfers used with the emoji, which may be dependent on the geographic location of the user or sender. In some examples, the system may allow the user to provide a custom value. In response to sending the message with the red envelope emoji and authorizing the red envelope emoji to conduct a value transfer, the system may transfer money from an account of the user to an account of the recipient of the message.

Although in this embodiment the emoji actions and associations are determined through message analysis, some emojis may be manually associated with an item, item classification, transaction, and/or the like. For example, a pizza emoji may be manually associated with purchasing a pizza by an admin associated with the system.

At operation 405, the system may dynamically update or enable user devices to conduct an action based on the associations created at operation 404. This may include using stock images or finding images off merchant websites, account information, third-party websites, merchant applications, third-party application advertisements, and/or the like to dynamically create electronic actuatable elements/buttons/switches and/or icons associated with an emoji action. These actuatable elements may appear in a GUI screen in response to a selection of an emoji as discussed above.

Figure 5:
FIG. 5 is a flow diagram illustrating an example process for allowing emoji based purchases as an emoji action.

FIG. 5 is a flow diagram illustrating processes 500 for allowing emoji based purchases as an emoji action. Processes 500 may be implemented on one or more devices of a system such as system 100 of FIG. 1 according to some embodiments. According to some embodiments, processes 500 may include one or more of processes 501-506 which may be implemented, at least in part, in the form of executable code stored on a non-transitory, tangible, machine readable media that, when run on one or more processors, may cause a system to perform one or more of the processes 501-506.

At operation 501, the system may receive a purchase request from a user device. For examples, a user may request the system to conduct a purchase using a payment instrument that the user associated with the system.

At operation 502, the system may determine whether the user received or has a voucher for the purchase. For example, a sender may have sent the user a voucher through an emoji action message, as discussed in more detail above.

If the user did not receive or have a voucher, the system may continue to operation 503 wherein the system uses a funding instrument associated an account of the user to conduct the purchase.

If the user does have or did receive a voucher, the system may continue to operation 504. At operation 504, the system may determine whether the voucher is associated with the merchant or item being purchased. In some examples, this may depend on the emoji that was used with the voucher. For example, if the voucher may be associated with a drink if it was sent to the user using a beer emoji. Furthermore the purchase may be for pizza or a soda, which the system may determine based on the information that merchant provides when attempting to complete a purchase.

If the voucher applies to the merchant and/or item, the system may continue to operation 505, such as a voucher associated with the beer emoji and a purchase of soda. Otherwise the system may continue to operation 503 wherein the system uses a funding instrument associated with the account of the user to conduct the transaction, such as when the emoji is the beer emoji but the purchase is for pizza (though in some examples, the beer emoji may also apply to pizza).

At operation 505, the system may identify the sender account associated with the voucher. In some examples, the voucher may have account information associated with it, such as username, phone number, and/or other identifying information that the system can use to identify the sender account in a database.

At process 506, the system may complete the purchase request at operation 501 with the sender account. In some embodiments, the system may reimburse the purchase with the sender account. In this manner, a sender having sent an emoji has seamlessly conducted a purchase on behalf of a user by simply sending an emoji message electronically.

Where applicable, various embodiments provided by the present disclosure may be implemented using hardware, software, or combinations of hardware and software. Also, where applicable, the various hardware components and/or software components set forth herein may be combined into composite components comprising software, hardware, and/or both without departing from the scope of the present disclosure. Where applicable, the various hardware components and/or software components set forth herein may be separated into sub-components comprising software, hardware, or both without departing from the scope of the present disclosure. In addition, where applicable, it is contemplated that software components may be implemented as hardware components and vice-versa.

Software, in accordance with the present disclosure, such as program code and/or data, may be stored on one or more computer readable mediums. It is also contemplated that software identified herein may be implemented using one or more general purpose or specific purpose computers and/or computer systems, networked and/or otherwise. Where applicable, the ordering of various steps described herein may be changed, combined into composite steps, and/or separated into sub-steps to provide features described herein.

The foregoing disclosure is not intended to limit the present disclosure to the precise forms or particular fields of use disclosed. As such, it is contemplated that various alternate embodiments and/or modifications to the present disclosure, whether explicitly described or implied herein, are possible in light of the disclosure. For example, the above embodiments have focused on merchants and customers; however, a customer or consumer can pay, or otherwise interact with any type of recipient, including charities and individuals. The payment does not have to involve a purchase, but may be a loan, a charitable contribution, a gift, etc. Thus, merchant as used herein can also include charities, individuals, and any other entity or person receiving a payment from a customer. Having thus described embodiments of the present disclosure, persons of ordinary skill in the art will recognize that changes may be made in form and detail without departing from the scope of the present disclosure. Thus, the present disclosure is limited only by the claims.

What is claimed is:

1. A non-transitory machine-readable medium having stored thereon machine-readable instructions executable to cause a machine to perform operations comprising:
    detecting, in a text-based communication platform, a message including at least one emoji;
    determining a relationship between text and the at least one emoji included in the message based on a clustering of the text with the at least one emoji;
    determining a pattern based on the relationship between the text and the at least one emoji;
    associating a set of actions with the at least one emoji based on the pattern;
    displaying the set of actions associated with the at least one emoji;
    receiving a selection of one or more actions from the set of actions;
    receiving a request to send the message including the at least one emoji;
    sending the message to a recipient; and
    applying, subsequent to the sending the message to the recipient, the one or more actions to an account of the recipient.

2. The non-transitory machine-readable medium of claim 1, wherein the operations further comprise:
    determining that a second account associated with the text-based communication platform is registered with an emoji system, wherein the set of actions is displayed subsequent to the determining that the second account associated with the text based communication platform is registered with the emoji system.

3. The non-transitory machine-readable medium of claim 1, wherein the one or more actions, when applied, deposits a credit into the account of the recipient.

4. The non-transitory machine-readable medium of claim 3, wherein the credit is deposited in a form of a voucher.

5. The non-transitory machine-readable medium of claim 4, wherein the voucher is usable by the recipient to purchase a specific good or service corresponding to the at least one emoji.

6. The non-transitory machine-readable medium of claim 5, wherein the operations further comprise:
    detecting a purchase of the specific good or service by the account of the recipient; and
    applying the voucher to cover at least a portion of the purchase of the specific good or service.

7. The non-statutory machine-readable medium of claim 6, wherein the applying the voucher to cover at least the portion of the purchase of the specific good or service comprises reimbursing a monetary amount up to an amount coverable by the voucher to the account of the recipient upon completion of the purchase of the specific good or service.

8. A method comprising:
    detecting, by one or more hardware processors in a text-based communication platform, a message including at least one emoji;
    displaying, by the one or more hardware processors based on the at least one emoji included in the message, a set of actions associated with the at least one emoji;
    receiving, by the one or more hardware processors, a selection of one or more actions from the set of actions;
    receiving, by the one or more hardware processors, a request to send the message including the at least one emoji;
    sending, in response to receiving the request, the message to a recipient; and
    applying, subsequent to the sending the message to the recipient, the one or more actions to an account of the recipient, wherein the applying comprises depositing a credit into the account of the recipient in a form of a voucher usable by the recipient to purchase a specific good or service corresponding to the at least one emoji.

9. The method of claim 8, further comprising:
    determining that a second account associated with the text-based communication platform is registered with an emoji system, wherein the set of actions is displayed upon determining that the second account associated with the text based communication platform is registered with the emoji system.

10. The method of claim 8, further comprising:
    detecting a purchase of the specific good or service by the recipient; and
    applying the voucher to cover at least a portion of the purchase of the specific good or service.

11. The method of claim 10, wherein the applying the voucher to cover at least the portion of the purchase of the specific good or service comprises reimbursing a monetary amount up to an amount coverable by the voucher to the account of the recipient upon completion of the purchase of the specific good or service.

12. The method of claim 8, further comprising:
    determining a relationship between text and the at least one emoji included in the message based on a clustering of the text with the at least one emoji;
    determining a pattern based on the relationship between the text and the at least one emoji; and
    associating the set of actions with the at least one emoji based on the pattern.

13. The method of 12, wherein the operations further comprise:
   collecting contextual information associated with the message, wherein the pattern is determined further based on the collected contextual information.

14. A system, comprising:
   a non-transitory memory; and
   one or more hardware processors coupled to the non-transitory memory and configured to read instructions from the non-transitory memory to cause the system to perform operations comprising:
      detecting, in a text-based communication platform, a message including at least one emoji;
      displaying, based on the at least one emoji included in the message, a set of actions associated with the at least one emoji;
      receiving a selection of one or more actions from the set of actions;
      receiving a request to send the message including the at least one emoji;
      sending, in response to receiving the request, the message to a recipient; and
      applying, subsequent to the sending the message to the recipient, the one or more actions to an account of the recipient, wherein the applying comprises depositing a credit into the account of the recipient usable by the recipient to purchase a specific good or service corresponding to the at least one emoji.

15. The system of claim 14, wherein the operations further comprise:
   determining that a second account associated with the text-based communication platform is registered with an emoji system, wherein the set of actions is displayed upon determining that the second account associated with the text based communication platform is registered with the emoji system.

16. The system of claim 14, wherein the operations further comprise:
   detecting a purchase of the specific good or service by the recipient; and
   applying the credit to cover at least a portion of the purchase of the specific good or service.

17. The system of claim 16, wherein the applying the credit to cover at least the portion of the purchase of the specific good or service comprises reimbursing a monetary amount up to an amount coverable by the credit to the account of the recipient upon completion of the purchase of the specific good or service.

18. The system of claim 14, wherein the operations further comprise:
   determining a relationship between text and the at least one emoji included in the message based on a clustering of the text with the at least one emoji;
   determining a pattern based on the relationship between the text and the at least one emoji; and
   associating the set of actions with the at least one emoji based on the pattern.

19. The system of claim 18, wherein the operations further comprise:
   collecting contextual information associated with the message, wherein the pattern is determined further based on the collected contextual information.

20. The system of claim 19, wherein the contextual information includes at least one of a time of day, a day of year, a location of at least one of a transmitting device or a receiving device associated with the message, an age of a sender associated with the message, an identity of the recipient, a gender of the sender or the recipient, a nationality of the sender or the recipient, or a date of significance of the sender or the recipient.

* * * * *